E. T. BUSSELL.
Car Spring.
No. 84,258.
Patented Nov. 24, 1868.
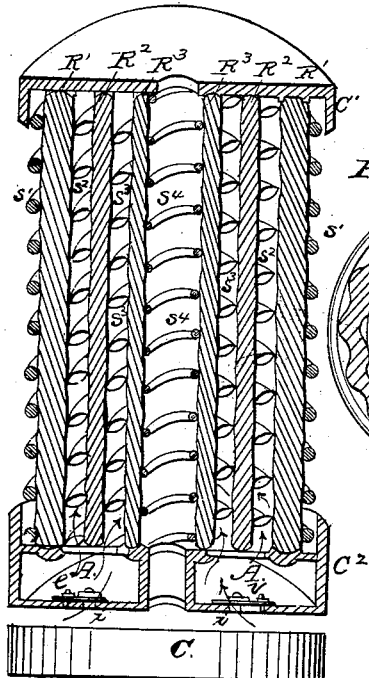
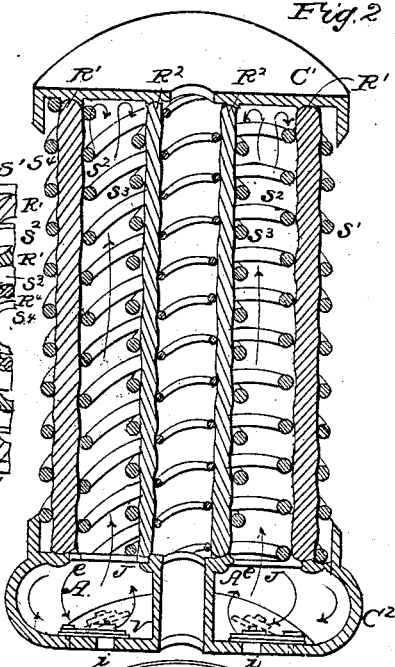
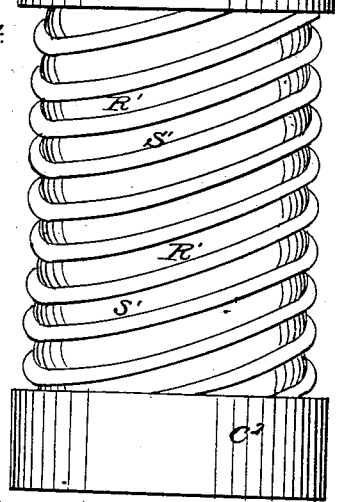
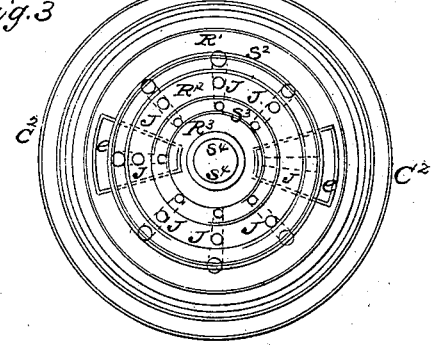
Witnesses
Turner A. Knox
Wm. M. Bussell
Inventor
Erastus T. Bussell

ERASTUS T. BUSSELL, OF INDIANAPOLIS, INDIANA.

Letters Patent No. 84,258, dated November 24, 1868.

IMPROVED CAR-SPRING.

The Schedule referred to in these Letters Patent and making part of the same.

*To all whom it may concern:*

Be it known that I, ERASTUS T. BUSSELL, of Indianapolis, in the county of Marion, and State of Indiana, have invented a new and useful Improvement in Combined Rubber, Spiral, and Pneumatic Springs for Railway-Cars and other purposes; and I do hereby declare that the following is a full, clear, and exact description thereof, reference being had to the accompanying drawings, as constituting a part of this description, and to the letters of reference marked thereon, like letters always referring to like parts.

My invention relates to springs employed in railway-cars, and for other analogous purposes; and consists in constructing them with two or more concentric hollow tubes of vulcanized India rubber, that are each supported, externally and internally, by spiral metallic springs, the spirals thus separating the rubber tubes, so as to form annular air-spaces between them, for the confinement of atmospheric air.

These air-spaces communicate with an air-chamber in the base-cup, upon which the rubber tubes and spiral springs rest, and into which air is pumped, to replenish any leakage by the vibratory motion of the car, when in motion; the whole combining, in a simple and efficient manner, the elastic properties of India rubber, steel, and atmospheric air.

The following description will enable skilled artisans to make and use my invention.

Figure 1 is a central vertical transverse section of the combined spring.

Figure 3 is a plan view, or horizontal section, and

Figure 4 is an elevation of the spring.

Figure 2 is a central vertical transverse section, the same as fig. 1, with the exception of the omission of the middle rubber tube $R^2$, and an enlargement of the air-chamber A, in the base-cup. The air element can be increased, in this manner, to any extent.

Figure 5 is a horizontal half section of fig. 1, showing a slight modification which I contemplate making in the shape of the concentric rubber tubes, this being nothing more than longitudinal corrugations in the same, rendering them stiffer laterally, and increasing the capacity of the air-spaces between them.

I construct my car-spring of annular hollow tubes of vulcanized India rubber, $R^1$ $R^2$ $R^3$, each of which is supported, internally and externally, by spiral steel springs, $S^1$ $S^2$ $S^3$ $S^4$, arranged so as to form air-spaces between the rubber tubes, as shown.

The rubber tubes and spiral springs are cut the same length, and rest on a hollow base, $C^2$, in which is formed the air-chamber A.

The upper plate of chambered base and the cap $C^1$ should have V-shaped annular grooves, to receive and compress the ends of the rubber tubes.

The upper plate of $C^2$ is pierced with openings, through which the air in the chamber A freely communicates with the air-spaces between $R^1$ and $R^2$, and $R^2$ and $R^3$. The lower plate of base $C^2$ has openings, $i$ $i$, for the admission of air to the chamber A.

These openings are closed by common clack-valves, V V, that prevent the air from escaping from the chamber A, but which allow the air to be pumped into it by the vibration of the car when running.

The contemplated corrugation of the rubber tubes, as shown in fig. 5, is intended on the score of economy chiefly, inasmuch as this form stiffens the walls of the rubber tubes, enabling the fabricator to save his material, by making them lighter than if plain, and, at the same time, it increases the capacity of the air-spaces between the tubes.

Another method of enlarging these air-spaces is to make the spiral springs $S^2$ and $S^3$ of flattened wire or rods, and coil them edgewise. In this case, the diameters of the contiguous rubber tubes must conform to the increased room required for the spiral springs.

When the whole spring is shortened under pressure, the confined air in these spiral spaces reacts upon the large body of air confined in chamber A, in base $C^2$, which greatly increases the elasticity of the combined spring.

In the patent of F. M. Ray, March 27, 1849, I am anticipated in a part of my invention, as I am fully aware, i. e., in the "combination of helical springs, made of metal, with and placed within hollow springs made of metallic or vulcanized India rubber" (although this "combination" was for a wholly different purpose, as Mr. Ray says himself, viz,) "whereby the rubber is prevented from spreading laterally, and from chafing against the guide-rod, and the tension of the rubber is increased by that of the helical spring, as described," and I distinctly disclaim so much of the invention as found in his, and correctly quoted above; but

What I claim as my invention is—

1. The formation of a rubber spiral and air-spring, by the arrangement and combination of two or more concentric hollow tubes of vulcanized India rubber, $R^1$ $R^2$ $R^3$, and four or more spiral springs, $S^1$ $S^2$ $S^3$ $S^4$, in such manner that the spirals support the rubber tubes externally as well as internally, and so as to form annular air-spaces, for the confinement of atmospheric air between said rubber tubes, substantially as described and shown.

2. The chambered base $C^2$, with induction-openings $i$, furnished with valves V, and eduction-openings J, between and in combination with the tubular and spiral spring, composed of the rubber tubes R and spirals S, arranged to operate in conjunction, as shown and described.

ERASTUS T. BUSSELL.

Witnesses:
TURNER A. KNOX,
WM. M. BUSSELL.